United States Patent
Asanuma et al.

(10) Patent No.: US 8,390,509 B2
(45) Date of Patent: Mar. 5, 2013

(54) RADAR SYSTEM AND DIRECTION DETECTING METHOD

(75) Inventors: Hisateru Asanuma, Kobe (JP); Masahiro Sakaguchi, Kobe (JP); Tomoya Kawasaki, Toyota (JP); Motomi Iyoda, Seto (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/574,449

(22) PCT Filed: Jan. 26, 2011

(86) PCT No.: PCT/IB2011/000109
§ 371 (c)(1),
(2), (4) Date: Jul. 20, 2012

(87) PCT Pub. No.: WO2011/092569
PCT Pub. Date: Aug. 4, 2011

(65) Prior Publication Data
US 2012/0306685 A1  Dec. 6, 2012

(30) Foreign Application Priority Data
Jan. 27, 2010  (JP) .................................. 2010-015341

(51) Int. Cl.
 *G01S 13/00* (2006.01)
(52) U.S. Cl. ........................... 342/149; 342/70; 342/147
(58) Field of Classification Search ............. 342/70–72, 342/147, 149–152
See application file for complete search history.

(56) References Cited

U.S. PATENT DOCUMENTS

| 4,646,095 A * | 2/1987 | Kanter .......................... 342/149 |
| 5,731,778 A * | 3/1998 | Nakatani et al. ................ 342/70 |
| 5,757,307 A * | 5/1998 | Nakatani et al. ................ 342/70 |
| 5,923,284 A * | 7/1999 | Artis et al. ..................... 342/129 |
| 6,198,426 B1* | 3/2001 | Tamatsu et al. ................. 342/70 |
| 6,317,073 B1* | 11/2001 | Tamatsu et al. ................ 342/70 |

(Continued)

FOREIGN PATENT DOCUMENTS

| EP | 0 766 100 A1 | 2/1997 |
| JP | 2000-147102 A | 5/2000 |

(Continued)

OTHER PUBLICATIONS

Dec. 5, 2011 International Search Report issued in International Application No. PCT/IB2011/000109.

*Primary Examiner* — Jack W Keith
*Assistant Examiner* — Peter Bythrow
(74) *Attorney, Agent, or Firm* — Oliff & Berridge, PLC

(57) ABSTRACT

A reflected wave that a transmitted wave is reflected by targets including a stationary target and a moving target is received as receiving signals of at least two reception antennas. A phase difference between beat signals at respective peak frequencies, generated from a transmitting signal and the receiving signals, is calculated. Directions of the targets are calculated in such a manner that the calculated phase difference of the targets is stored in a storage area in advance, it is predicted whether peak frequencies of the plurality of targets overlap each other, a predicted phase difference of the stationary target at the time when the peak frequencies overlap each other is calculated on the basis of the stored phase difference, and a predicted phase difference of the moving target is calculated on the basis of the calculated phase difference and the predicted phase difference of the stationary target.

5 Claims, 9 Drawing Sheets

U.S. PATENT DOCUMENTS

| | | | |
|---|---|---|---|
| 6,320,531 B1* | 11/2001 | Tamatsu | 342/109 |
| 6,337,656 B1* | 1/2002 | Natsume et al. | 342/149 |
| 6,683,559 B2* | 1/2004 | Matsui et al. | 342/159 |
| 6,750,804 B2* | 6/2004 | Chen et al. | 342/89 |
| 6,801,156 B1* | 10/2004 | Wasiewicz | 342/95 |
| 6,924,762 B2* | 8/2005 | Miyake et al. | 342/70 |
| 7,330,149 B2* | 2/2008 | Weatherford | 342/149 |
| 7,385,550 B2* | 6/2008 | Winter et al. | 342/70 |
| 7,417,584 B1* | 8/2008 | Reifler et al. | 342/148 |
| 7,579,981 B2* | 8/2009 | Kishida | 342/109 |
| 7,911,371 B2* | 3/2011 | Karam | 342/25 C |
| 2003/0112173 A1* | 6/2003 | Seki et al. | 342/70 |
| 2003/0122703 A1* | 7/2003 | Kishida et al. | 342/70 |
| 2004/0125011 A1* | 7/2004 | Kumon et al. | 342/70 |
| 2004/0227662 A1* | 11/2004 | Sawamoto et al. | 342/70 |
| 2004/0252047 A1* | 12/2004 | Miyake et al. | 342/107 |
| 2006/0132353 A1* | 6/2006 | Natsume et al. | 342/147 |
| 2007/0008210 A1* | 1/2007 | Kibayashi et al. | 342/70 |
| 2010/0033366 A1* | 2/2010 | Shibata et al. | 342/70 |

FOREIGN PATENT DOCUMENTS

| | | |
|---|---|---|
| JP | 2001-033545 A | 2/2001 |
| JP | 2004-340755 A | 12/2004 |
| WO | WO 2004/029650 A1 | 4/2004 |

* cited by examiner $\Delta \phi = \phi 2 - \phi 1$
$\Delta \phi = 2\pi(d \cdot \sin\theta / \lambda)$

FIG.5

|  |  | $\Delta\phi 1$ | $\Delta\phi 2$ | $\Delta\phi 3$ | ..... |
|---|---|---|---|---|---|
| MOVING TARGET | UP | OOO | OOO | OOO | |
| | DOWN | OOO | OOO | OOO | |
| STATIONARY TARGET 1 | UP | OOO | OOO | OOO | |
| | DOWN | OOO | OOO | OOO | |
| STATIONARY TARGET 2 | UP | OOO | OOO | OOO | |
| | DOWN | OOO | OOO | OOO | |

RADAR SYSTEM AND DIRECTION DETECTING METHOD

BACKGROUND OF THE INVENTION

1. Field of the Invention

The invention relates to a radar system that detects a target and a target direction detecting method.

2. Description of the Related Art

There is known an FM-CW or phase-monopulse radar system as a radar system that detects a target. Japanese Patent Application Publication No. 2000-147102 (JP-A-2000-147102) describes an FM-CW radar system. In addition, JP-A-2000-147102 describes that it is determined whether the neighborhood sum of a spectrum peak is smaller than or equal to a threshold and it is determined whether a moving object prediction flag is set, and, when the neighborhood sum is smaller than or equal to the threshold and the moving object prediction flag is not set, it is determined that the spectrum peak is the spectrum peak of a stationary object.

In addition, Japanese Patent Application Publication No. 2004-340755 (JP-A-2004-340755) describes a phase-monopulse radar system. In JP-A-2004-340755, a radar wave formed of a frequency increasing portion, a frequency decreasing portion and a frequency constant portion is transmitted, a reflected wave of the radar wave is received by two antennas, and, for each of receiving signals, a beat signal that indicates a difference in frequency between the transmitting signal and the receiving signal is generated for each of the frequency increasing portion, the frequency decreasing portion and the frequency constant portion. Then, on the basis of a phase difference between the beat signals at the respective peak frequencies of the frequency increasing portion beat signals and a phase difference between the beat signals at the respective peak frequencies of the frequency decreasing portion beat signals, when a pair of the peak frequencies of the frequency increasing portion beat signals and the peak frequencies of the frequency decreasing portion beat signals cannot be matched with each other, it is assumed that peak frequencies resulting from a plurality of objects overlap each other and then the phase of the object is calculated from a phase difference between the beat signals at the respective peak frequencies of the frequency constant portion beat signals.

There is known a phase-monopulse system as one of systems that measure the direction of a target with respect to a radar system. FIG. 1 shows a diagram of the principle of a phase-monopulse system. In the phase-monopulse system, for example, two antennas A1 and A2 are arranged, and the direction of an incoming radio wave is obtained on the basis of a phase difference ($\Delta\phi$) of signals received respectively by the antennas A1 and A2. The phase difference is expressed by the mathematical expression (1) where the incoming angle is $\theta$, the distance between the antennas is d and the wavelength of a carrier wave (reflected wave) is $\lambda$.

$$\Delta\phi = 2\pi \cdot (d \cdot \sin\theta / \lambda) \qquad (1)$$

In calculating the phase difference, first, a transmitted wave modulated with a triangular wave is output from an antenna and then parts of received waves reflected by the target and received by the antennas are mixed with part of the transmitted wave to thereby acquire the frequencies of beat signals. Then, the beat signals are subjected to Fourier transformation to obtain frequency spectrum data, and then the peak frequencies of the respective frequency spectra are detected from the frequency spectrum data. The frequency spectrum data are expressed as complex vectors on a complex plane. Each peak frequency of the detected frequency spectrum is a frequency corresponding to a distance to the target and a relative velocity with respect to the target. Then, when the peak frequencies of the frequency spectra are identified, the phases of the beat signals at the respective peak frequencies are calculated. Here, because the frequency spectrum data may be expressed as complex vectors on a complex plane, the phase of each beat signal may be, for example, calculated from an angle made between the complex vector and the real axis on the complex plane. Then, the difference in phase between the respective beat signals is obtained to calculate the phase difference, and then the direction of the target may be calculated from the calculated phase difference.

Here, in the above described phase-monopulse system, in the case where a plurality of targets are present, if the peak frequencies of frequency spectra corresponding to the respective targets coincide with each other, the directions of the respective targets may not be accurately calculated. FIG. 2 shows an example of the positional relationship between targets and a radar system. More specifically, FIG. 2 shows a situation in which an oncoming vehicle (moving target) is travelling ahead of a vehicle (host vehicle) equipped with the radar system and guard rails (stationary target) each having a plurality of posts are installed on a side over the oncoming vehicle.

Here, FIG. 3A is an example of frequency spectrum data acquired by the radar system shown in FIG. 2. FIG. 3B shows a graph that expresses the frequency spectrum data of FIG. 3A as a complex vector. In FIG. 3A, the abscissa axis represents a frequency, and the ordinate axis represents a reflection level. The solid line in FIG. 3A indicates reflection levels from the stationary target, that is, the guard rails. The four peaks in FIG. 3A correspond to reflected waves from the posts of the guard rails. The dotted line in FIG. 3A indicates a reflection level from the moving target, that is, the oncoming vehicle. In the example of FIG. 3A, the peak frequency of the moving target overlaps with the peak frequency of the stationary target, and the peak values of the reflection levels coincide with each other. If the peak frequencies of the frequency spectra overlap each other in this way, the phases are combined and cannot be separated from each other in the radar system. In other words, the frequency spectrum data originally include a complex vector corresponding to the post of the guard rail and a complex vector corresponding to the oncoming vehicle; however, actually, only a resultant vector of the two complex vectors can be acquired. Note that FIG. 3B shows a complex plane, the X-axis is a real axis, and the Y-axis is an imaginary axis. FIG. 3B shows an actually acquired resultant vector and also shows a complex vector corresponding to a reflection wave from the stationary target and a complex vector corresponding to a reflection wave from the moving target.

In this way, if the peak frequencies of the frequency spectra corresponding to the respective targets coincide with each other, the directions of the respective targets cannot be accurately calculated. In addition, this may lead to a malfunction of a pre-crash safety system (PCS) or non-detection of the targets.

SUMMARY OF INVENTION

The invention provides a radar system and a target direction calculation method that accurately calculate the directions of different targets even when frequency spectra corresponding to the different targets overlap each other.

According to an aspect of the invention, phase differences of respective targets are stored in a storage area in advance, and, when it is assumed that peak frequencies of frequency spectra corresponding to reflected waves from the different targets overlap each other, a phase difference of a stationary target at the time when the peak frequencies of the frequency spectra overlap each other is calculated as a predicted phase difference from the history of the phase difference of the stationary target, stored in the storage area, and then a direction of a moving target is calculated using the calculated predicted phase difference of the stationary target.

A first aspect of the invention relates to a radar system. The radar system includes a transmission antenna; at least two reception antennas; a transmitting unit that transmits a frequency-modulated transmitting signal as a transmitted wave transmitted via the transmission antenna; a receiving unit that receives reflected waves that the transmitted wave is reflected by targets including a stationary target and a moving target and that are received via the at least two reception antennas as receiving signals of the respective reception antennas; a direction calculating unit that calculates a phase difference between beat signals at respective peak frequencies to calculate directions of the targets on the basis of the calculated phase difference, wherein the beat signals are generated from the transmitting signal and the receiving signals of the respective reception antennas; a storage unit that stores the phase difference, calculated by the direction calculating unit, in a storage area; a prediction unit that predicts whether peak frequencies of the plurality of targets overlap each other on the basis of predicted information, which includes direction information about the directions of the targets, calculated by the direction calculating unit, and which predicts a variation in the peak frequency of each of the beat signals; and a predicted phase difference calculating unit that calculates a predicted phase difference of the stationary target at the time when the peak frequencies overlap each other on the basis of the phase difference stored in the storage area, and that calculates a predicted phase difference of the moving target on the basis of the phase difference calculated by the direction calculating unit and the predicted phase difference of the stationary target, wherein, when the direction calculating unit predicts that the peak frequencies overlap each other, the direction calculating unit calculates the direction of the moving target on the basis of the predicted phase difference of the moving target, calculated by the predicted phase difference calculating unit.

One of the features of the radar system according to the aspect of the invention is to store the phase difference, calculated by the direction calculating unit, particularly, the phase difference of the stationary target, in the storage area. Not the direction or the relative velocity calculated on the basis of the phase difference but the phase difference of the stationary target itself is stored. By so doing, it is possible to calculate a predicted value of the phase difference (predicted phase difference) of the stationary target on the basis of the stored phase difference of the stationary target. When the prediction unit predicts that the peak frequencies of the plurality of targets overlap each other, the directions of the targets are calculated on the basis of the calculated predicted phase difference of the stationary target. By so doing, even if the peak frequencies of the plurality of targets overlap each other, it is possible to accurately calculate the directions of the targets. As a result, it is possible to avoid a malfunction of a pre-crash safety system (PCS) or non-detection of the targets. Prediction as to whether the peak frequencies overlap each other is performed on the basis of predicted information. The predicted information at least includes direction information about the directions of the targets, calculated by the direction calculating unit. The predicted information, for example, includes relative velocity information about relative velocities between the radar system and the targets, information about the interval of the reception antennas, and the like, in addition to the direction information. When the predicted information is stored in advance, it is possible to predict whether the peak frequencies of the plurality of targets overlap each other.

When the radar system according to the aspect of the invention is, for example, equipped for a vehicle, the radar system is able to calculate the direction of a mobile unit (moving target), such as another travelling vehicle, or a stationary object (stationary target), such as a sign and a guard rail. The targets according to the aspect of the invention include the moving target and the stationary target. The phase differences stored in the storage area may include both the phase difference of the moving target and the phase difference of the stationary target. However, according to the aspect of the invention, because the direction of the moving target is finally calculated on the basis of information about the stationary target, stored in the storage area, at least the phase difference of the stationary target is stored in the storage area.

In the above configuration, the predicted phase difference calculating unit may calculate the phase difference of the stationary target at the time when the peak frequencies overlap each other as the predicted phase difference of the stationary target on the basis of the phase difference stored in the storage area, and may calculate the phase difference of the moving target as the predicted phase difference of the moving target from a difference between the phase difference calculated by the direction calculating unit and the predicted phase difference of the stationary target.

Note that the predicted phase difference of the stationary target and the predicted phase difference of the moving target, calculated on the basis of the predicted phase difference of the stationary target, are used when it is predicted that the peak frequencies overlap each other. A mode in which the peak frequencies overlap each other includes the case where the peak values of reflection levels (hereinafter, simply referred to as peak values) at the peak frequencies of the different targets completely coincide with each other, the case where the peak value at one of the peak frequencies is higher than the peak value at the other one of the peak frequencies, and the case where the peak value at one of the peak frequencies is lower than the peak value at the other one of the peak frequencies. For example, when the peak value at the peak frequency relevant to the moving target is higher than the peak value at the peak frequency relevant to the stationary target, the peak frequency relevant to the moving target may be extracted. The peak frequency relevant to the moving target may be extracted; however, the phase difference calculated from the extracted peak frequency includes the phase difference of the moving target and the phase difference of the stationary target. That is, the phase difference calculated from the extracted peak frequency is just a combined phase difference of the phase difference of the moving target and the phase difference of the stationary target. Thus, the radar system according to the aspect of the invention may be desirably used not only when the peak frequencies completely coincide with each other but also when the peak value at one of the peak frequencies is higher than or lower than the peak value at the other one of the peak frequencies. Thus, it is possible to further accurately calculate the direction of the moving target.

In the above configuration, the radar system may further include a determining unit that determines whether a difference between the predicted phase difference of the stationary target, calculated by the predicted phase difference calculating unit, and the phase difference calculated by the direction calculating unit falls within a predetermined range, wherein, when the determining unit determines that the difference between the predicted phase difference of the stationary target and the phase difference calculated by the direction calculating unit does not fall within the predetermined range, the predicted phase difference calculating unit may calculate the predicted phase difference of the moving target on the basis of the phase difference calculated by the direction calculating unit and the predicted phase difference of the stationary target.

When there is a difference that falls outside the predetermined range, the phase difference calculated by the direction calculating unit includes the phase difference of the moving target and the phase difference of the stationary target, so the predicted phase difference calculating unit calculates the predicted phase difference of the moving target in this case. In other words, when there is no difference or when there is an extremely slight difference, the phase difference presumably includes only the phase difference of the stationary target. Then, in the aspect of the invention, it is determined whether to calculate the predicted phase difference on the basis of the difference. Note that the predetermined range may be set on the basis of the interval of the reception antennas, the accuracy of a calculated direction, the range of detection of a reflected wave, and the like. Note that, in the aspect of the invention, because the prediction unit predicts whether the peak frequencies of the plurality of targets overlap each other, the determining unit has a function of determining whether to execute processing by the predicted phase difference calculating unit and checking the result predicted by the prediction unit.

A second aspect of the invention relates to a target direction calculation method. The direction calculation method includes: transmitting a frequency-modulated transmitting signal as a transmitted wave transmitted via a transmission antenna; receiving reflected waves that the transmitted wave is reflected by targets including a stationary target and a moving target and that are received via at least two reception antennas as receiving signals of the respective reception antennas; calculating a phase difference between beat signals at respective peak frequencies to calculate directions of the targets on the basis of the calculated phase difference, wherein the beat signals are generated from the transmitting signal and the receiving signals of the respective reception antennas; storing the calculated phase difference in a storage area; predicting whether peak frequencies of the plurality of targets overlap each other on the basis of predicted information, which includes direction information about the calculated directions and which predicts a variation in the peak frequency of each of the beat signals; and calculating a predicted phase difference of the stationary target at the time when the peak frequencies overlap each other on the basis of the phase difference stored in the storage area, and calculating a predicted phase difference of the moving target on the basis of the calculated phase difference and the predicted phase difference of the stationary target, wherein, when it is predicted that the peak frequencies overlap each other, the direction of the moving target is calculated on the basis of the calculated predicted phase difference of the moving target.

According to the aspects of the invention, for example, even an existing radar system is also able to calculate the direction of the moving target by causing a computer of the radar system to execute predetermined steps according to the above direction calculation method. In other words, without changing the hardware of the radar system, it is possible to improve the accuracy of calculating the direction of the moving target.

Note that the aspects of the invention may be a program that implements the processes executed by the above described radar system. Furthermore, the aspects of the invention may be a computer readable recording medium in which the above programs are recorded. In this case, the functions may be provided in such a manner that a computer, or the like, is caused to load the programs in the recording medium and execute the programs. Note that the recording medium that is readable by a computer, or the like, is a recording medium that stores information, such as data and programs, through electrical, magnetic, optical, mechanical or chemical action and that allows a computer, or the like, to read the information.

According to the aspects of the invention, it is possible to provide a radar system and a target direction calculation method that are able to accurately calculate directions of targets even when the frequency spectra corresponding to different targets overlap each other.

BRIEF DESCRIPTION OF DRAWINGS

The features, advantages, and technical and industrial significance of this invention will be described below with reference to the accompanying drawings, in which like numerals denote like elements, and wherein:

FIG. 5 shows an example of a storage area in a memory;

DETAILED DESCRIPTION OF EMBODIMENTS

Hereinafter, a radar system according to an embodiment of the invention will be described with reference to the accompanying drawings. The radar system 2 according to the present embodiment is equipped for a vehicle 1, and may be used to detect a target present around the vehicle, such as another vehicle, a sign and a guard rail. The result of detection of a target is output to a storage device, an electronic control unit (ECU), or the like, of the vehicle 1, and may be used in vehicle control of, for example, a pre-crash safety system (PCS), or the like. However, the radar system 2 according to the present embodiment may also be used for an application other than an in-vehicle radar system.

Figure 1:
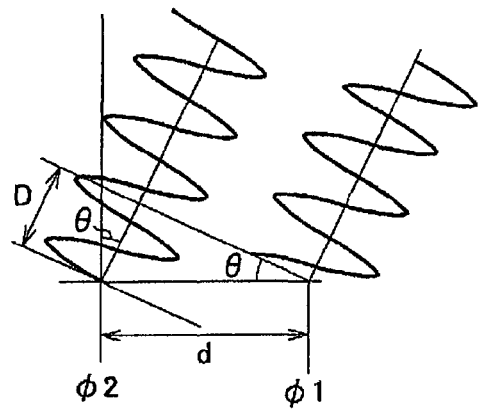
FIG. 1 shows a diagram of the principle of a phase-monopulse system.

In the radar system according to the first embodiment, a phase-monopulse system is used as an angle measurement system for detecting the direction of a target and a frequency modulated continuous wave (FM-CW) system is used as a distance measurement system for detecting a relative velocity with respect to a target and a distance to a target. In the phase-monopulse system, for example, two antennas A1 and A2 are arranged, and then the direction of an incoming radio wave is obtained on the basis of a phase difference ($\Delta\theta$) between signals received by the respective antennas A1 and A2 (see FIG. 1). In the FM-CW system, a transmitted wave modulated with a triangular wave is transmitted, and then a difference between a reflected wave reflected from a target and the transmitted wave is obtained to calculate a distance to the target and a velocity of the target because, the frequency of the reflected wave includes a component of a time delay due to a distance and a component of a Doppler shift due to a velocity difference.

Figure 4:
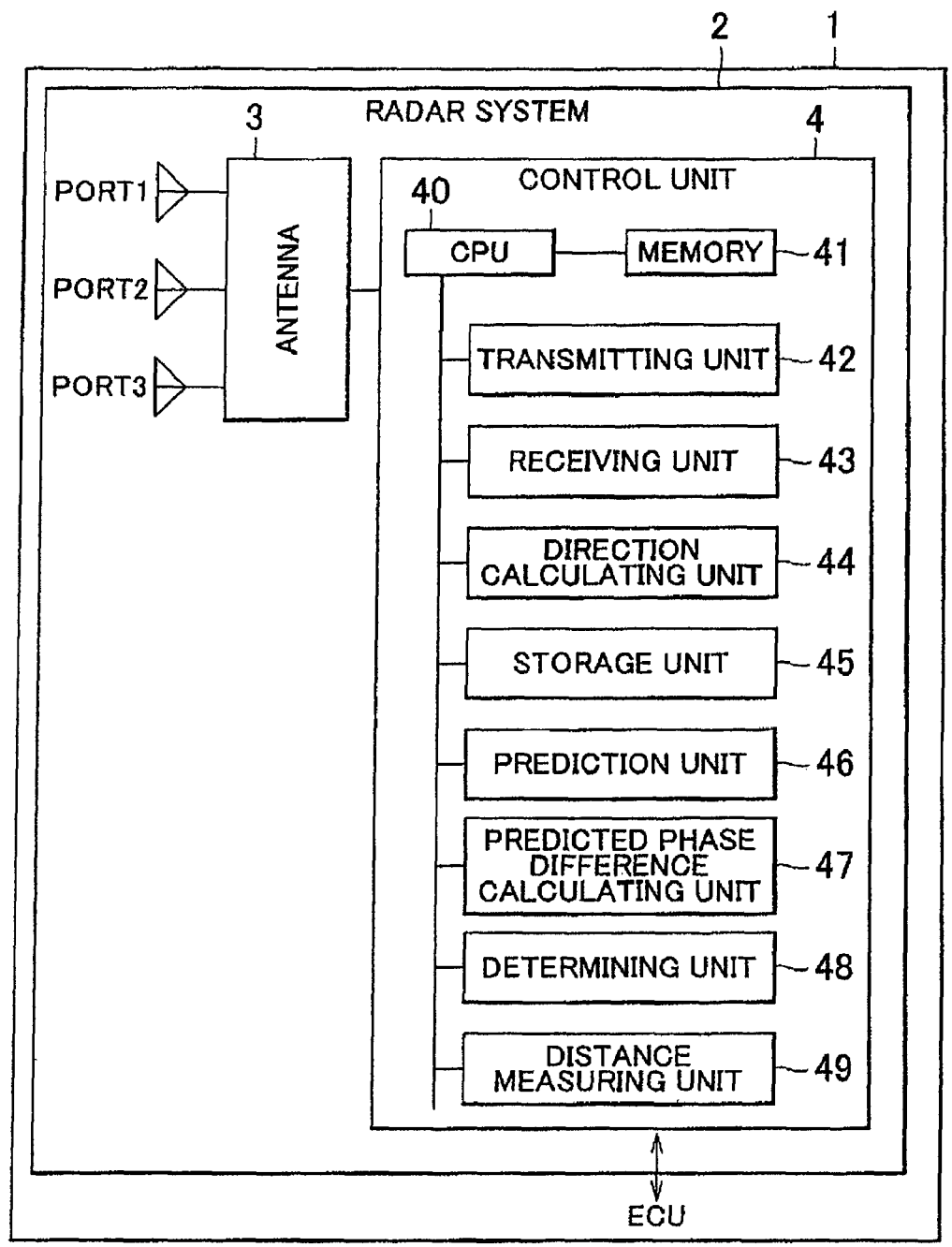
FIG. 4 shows the schematic configuration of a radar system according to a first embodiment.

FIG. 4 shows the schematic configuration of the radar system 2 according to the first embodiment. The radar system 2 according to the first embodiment is mounted at the front of the vehicle 1. The radar system 2 includes an antenna 3 and a control unit 4. Although not shown in the drawing, the radar system 2 according to the first embodiment includes a transmitting circuit, a receiving circuit, an AD converter, a DA converter, a Fourier transformation circuit, and the like, which are included in an existing radar system as a hardware configuration controlled by the control unit 4. In the present embodiment, the case where the radar system 2 is mounted at the front of the vehicle 1 will be described as an example; instead, the radar system 2 may be, for example, mounted at the side or rear of the vehicle.

The antenna 3 transmits a millimeter waveband transmitted wave, and receives a reflected wave that the transmitted wave is reflected by a target. The antenna 3 according to the first embodiment has three ports 1, 2 and 3 arranged at equal intervals d. The function of each of ports 1, 2 and 3 (hereinafter, when it is not necessary to separately describe the ports, these ports are simply referred to as ports as a whole) may be appropriately switched by the control unit 4. In addition, in the first embodiment, the antenna 3 has three ports; however, it is applicable as long as the antenna 3 has at least two ports that function as a receiving antenna, and the number of ports is not limited.

The control unit 4 controls the components of the radar system 2, and may be implemented by a computer that includes a central processing unit (CPU) 40, a memory 41, and the like, and a program executed on the computer. The memory 41 includes a volatile random access memory (RAM) and a nonvolatile read only memory (ROM). The ROM includes a rewritable semiconductor memory, such as a flash memory, an erasable programmable read-only memory (EPROM) and an electrically erasable programmable read-only memory (EEPROM). The CPU 40 expands various programs stored in the ROM for controlling the radar system 2 in a work area of the RAM, and executes processing in accordance with the various programs on the basis of various data input to the control unit 4. The control unit 4 includes a transmitting unit 42, a receiving unit 43, a direction calculating unit 44, a storage unit 45, a prediction unit 46, a predicted phase difference calculating unit 47, a determining unit 48 and a distance measuring unit 49. The components of the control unit 4 may be configured as computer programs executed on the CPU 40. In addition, the components may be configured as exclusive processors.

The transmitting unit 42 transmits a frequency-modulated transmitting signal as a transmitted signal that is transmitted via the antenna 3. In the radar system 2 according to the first embodiment, a phase-monopulse system is used as an angle measurement system, and an FM-CW system is used as a distance measurement system. Then, in the first embodiment, the transmitting unit 42 transmits a transmitted wave, modulated with a triangular wave, from the antenna 3.

The receiving unit 43 receives reflected waves, which the transmitted wave is reflected by targets, as receiving signals of the respective ports of the antenna 3. Note that each port of the antenna 3 may be appropriately switched between a transmitting function and a receiving function, and this switching may be performed by the transmitting unit 42 or the receiving unit 43. In addition, a switching unit may be additionally provided for switching. Furthermore, a transmit-only or receive-only port may be provided for the antenna.

The direction calculating unit 44 calculates the phase difference between beat signals at the respective peak frequencies, generated from the transmitting signal and the receiving signals corresponding to the respective ports for each of an up section (UP) and a down section (DOWN), and then calculates the directions of the targets on the basis of the calculated phase difference. The direction calculating unit 44 mixes part of the received waves received by the antenna 3 with part of the transmitted wave to acquire the frequencies of the beat signals. The beat signals are calculated by obtaining differences between the transmitting signal and the receiving signals. In addition, when the prediction unit 46 predicts that the peak frequencies overlap each other, the direction calculating unit 44 calculates the directions of the targets on the basis of the predicted phase difference of the moving target, calculated by the predicted phase difference calculating unit 47.

The storage unit 45 stores the phase difference, calculated by the direction calculating unit 44, in a predetermined, area in the RAM of the memory 41. FIG. 5 shows an example of the storage area in the memory. FIG. 5 shows an example in which a plurality of phase differences ($\Delta\theta$) are stored target by target for each of an up section (UP) and a down section (DOWN).

The prediction unit 46 predicts whether the peak frequencies of the plurality of targets overlap each other on the basis of predicted information, including direction information about the directions calculated by the direction calculating unit 44, relative velocity information, and information about the receiving antenna. The relative velocity information is information about relative velocities between the radar system 2 and the targets, and is calculated by the distance measuring unit 49. The information about the receiving antenna is information about the interval of the ports of the antenna 3 (interval d in the present embodiment).

The predicted phase difference calculating unit 47 calculates the phase difference of a stationary target on the basis of the phase differences stored in the storage area in the RAM of the memory 41 when the peak frequencies overlap each other, and obtains a difference between the phase difference calculated by the direction calculating unit 44 and the predicted phase difference of the stationary target to thereby calculate the predicted phase difference of the moving target. The predicted phase difference of the moving target is calculated for both the up section and the down section, and any one of the phase differences is appropriately selected.

The determining unit 48 determines whether a difference between the predicted phase difference of the stationary target, calculated by the predicted phase difference calculating unit 47, and the phase difference calculated by the direction calculating unit 44 falls within a predetermined range.

The distance measuring unit 49 calculates relative velocities with respect to the targets and distances to the targets by means of FM-CW system. A calculation method will be specifically described later.

Figure 2:
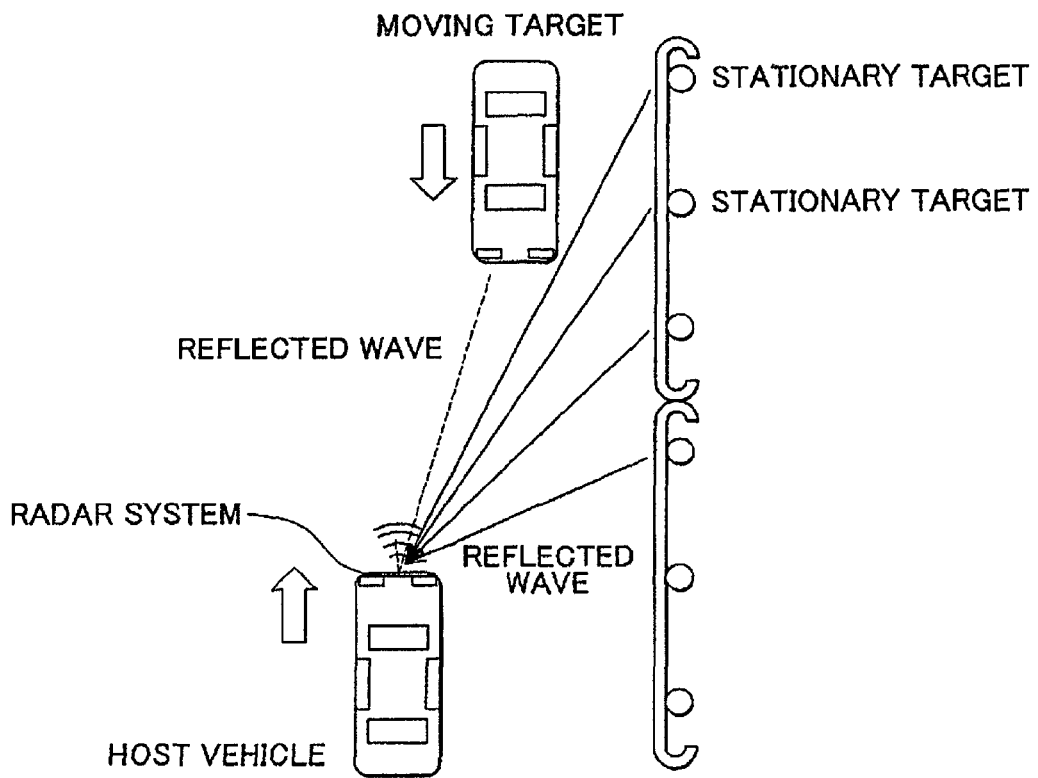
FIG. 2 shows an example of the positional relationship between targets and a radar system.

Next, the process executed in the radar system 2 according to the first embodiment will be described. The order of the process described below is just one example, and the order of the process may be appropriately changed depending on an embodiment. In the following description, the case where the direction of a moving target is detected in the situation shown in FIG. 2 will be described as an example. FIG. 2 shows a situation that an oncoming vehicle (moving target) is travelling ahead of the vehicle 1 equipped with the radar system 2 and guard rails (stationary target) each having a plurality of posts are installed on a side over the oncoming vehicle. As is described above, in the situation shown in FIG. 2, when the peak frequency of the moving target overlaps with the peak frequency of the stationary target, the phases are combined with each other and cannot be separated from each other in the radar system (see FIG. 3A and FIG. 3B).

Figure 3A:
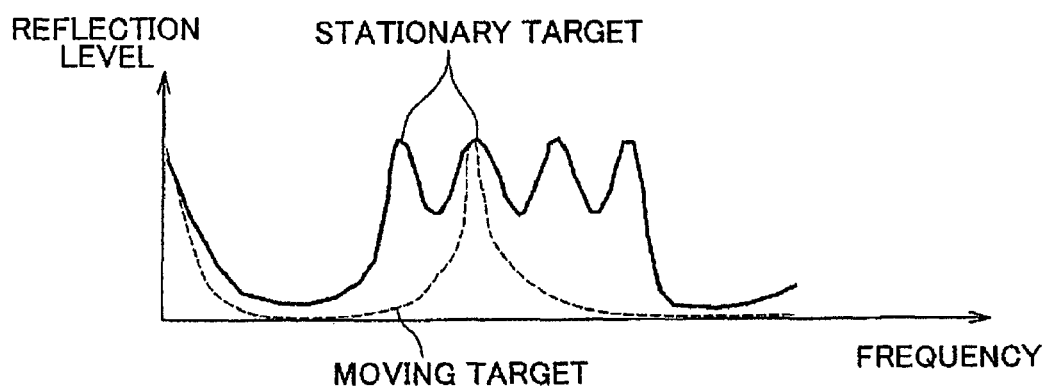
FIG. 3A shows an example of frequency spectrum data acquired by an existing radar system in the situation shown in FIG. 2.
Figure 3B:
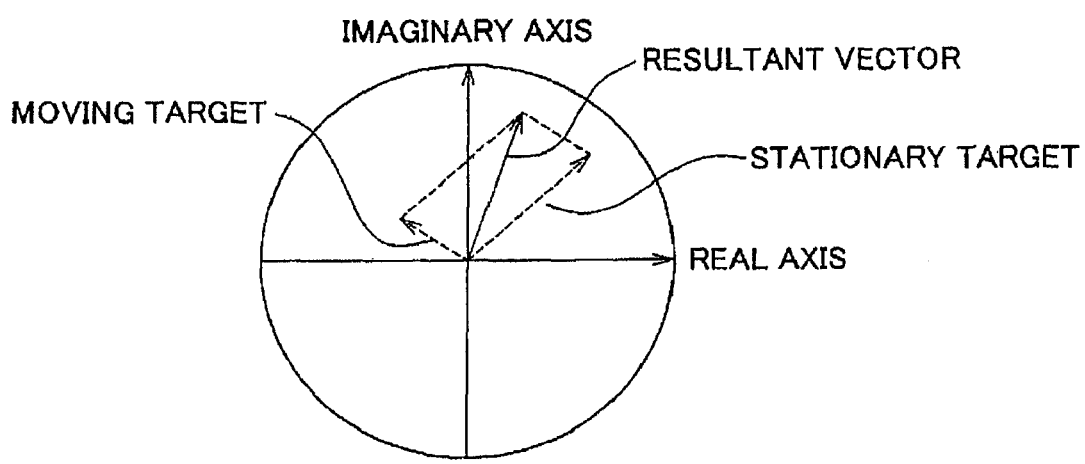
FIG. 3B shows a graph that expresses the frequency spectrum data of FIG. 3A as a complex vector.

FIG. 3A and FIG. 3B are graphs that show an example in which the peak frequency of the moving target overlaps with the peak frequency of the stationary target and the peak values of reflection levels (hereinafter, simply referred to as peak values) coincide with each other. A mode in which the peak frequencies overlap each other not only includes the case where the peak values at the peak frequencies of different targets completely coincide with each other but also includes the case where the peak value at one of the peak frequencies is higher than the peak value at the other one of the peak frequencies or the case where the peak value at one of the peak frequencies is lower than the peak value at the other one of the peak frequencies. For example, when the peak value at the peak frequency of the moving target is higher than the peak value at the peak frequency of the stationary target, the peak frequency of the moving target may be extracted. However, the phase difference calculated from the extracted peak frequency includes both the phase difference of the moving target and the phase difference of the stationary target. That is, the extracted peak frequency is just a combined phase difference of the phase difference of the moving target and the phase difference of the stationary target.

Figure 6A:
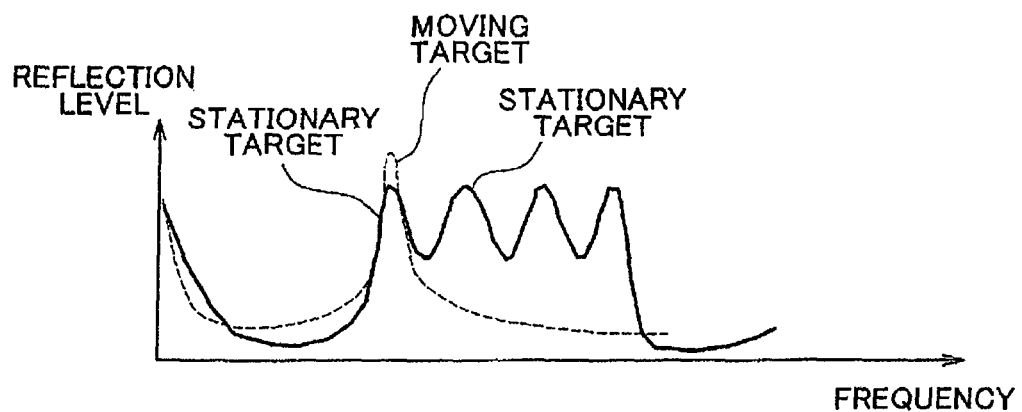
FIG. 6A shows an example of frequency spectrum data acquired by the radar system according to the first embodiment in the situation shown in FIG. 2.
Figure 6B:
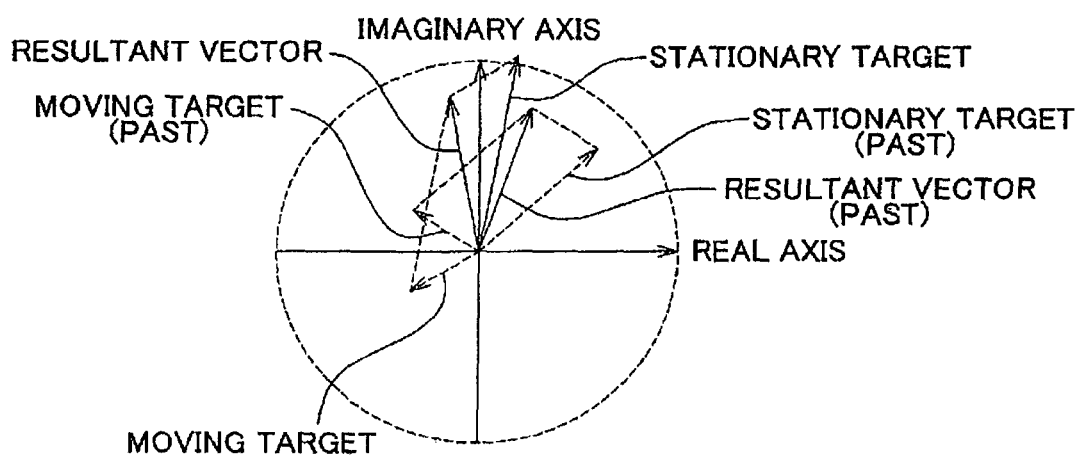
FIG. 6B shows a graph that expresses the frequency spectrum data of FIG. 6A as a complex vector.

Here, FIG. 6A is a graph that shows an example of frequency spectrum data acquired by the radar system according to the first embodiment in the situation shown in FIG. 2, and FIG. 68 is a graph in which the frequency spectrum data of FIG. 6A are expressed as a complex vector. In FIG. 6A, the abscissa axis represents a frequency, and the ordinate axis represents a reflection level. The solid line in FIG. 6A indicates reflection levels from the stationary target, that is, the guard rails. The four peaks in FIG. 6A correspond to reflected waves from the posts of the guard rails. The dotted line in FIG. 6A indicates a reflection level from the oncoming vehicle that is the moving target. In the example of FIG. 6A, the peak frequency of the moving target overlaps with the peak frequency of the stationary target, and the peak value of the moving target is slightly higher than the peak value of the stationary target. In the example shown in FIG. 6A and FIG. 6B, the peak value of the moving target is higher than the peak value of the stationary target, so it is possible to extract the peak frequency of the moving target. However, the complex vector of the moving target, corresponding to the phase difference calculated from the extracted peak frequency, is just a resultant vector of the complex vector of the moving target and the complex vector of the stationary target. That is, if the resultant vector shown in FIG. 6B is determined as the complex vector of the moving target, a calculated direction has an error. Then, in the first embodiment, occurrence of the error is suppressed by executing the process described later. Note that FIG. 6B shows a complex plane, the X-axis is a real axis, and the Y-axis is an imaginary axis. FIG. 6B shows an actually acquired resultant vector and also shows a complex vector corresponding to the stationary target and a complex vector corresponding to the moving target. In addition, FIG. 6B also shows previous complex vectors.

In the following description, the case where the peak value at the peak frequency of the moving target is higher than the peak value at the peak frequency of the stationary target as described above will be described as an example. However, with the radar system 2 according to the first embodiment, it is also possible to accurately calculate the direction of the moving target when the peak values completely coincide with each other or when the peak frequency of the moving target is lower than the peak frequency of the stationary target.

Figure 7:
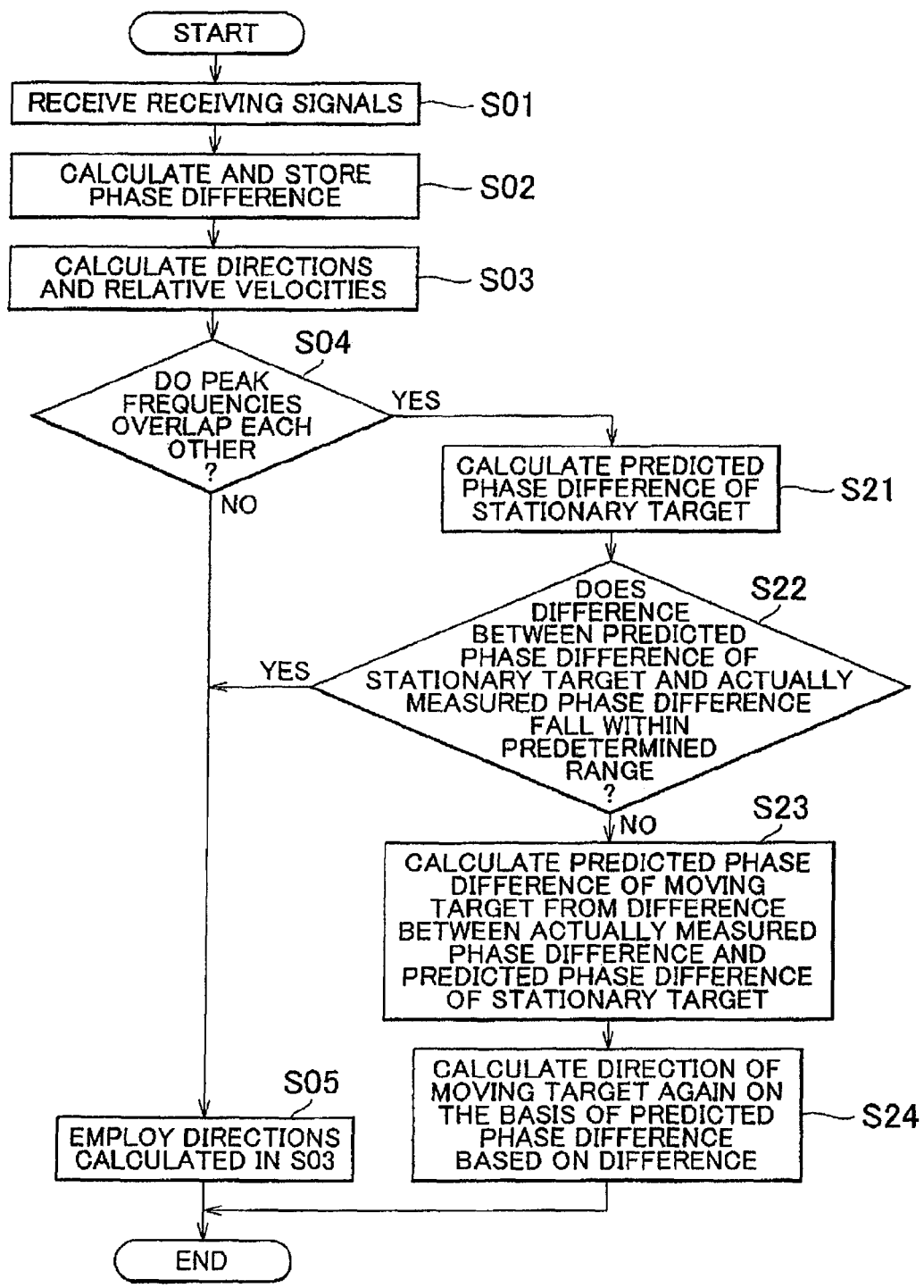
FIG. 7 shows a flowchart of direction detecting process executed by the radar system according to the first embodiment.

Here, FIG. 7 shows a flowchart of direction detecting process executed by the radar system according to the first embodiment. The process described below is executed by the control unit 4. First, in step S01, the receiving unit 43 receives reflected waves, which a transmitted wave transmitted by the transmitting unit 42 via the antenna 3 is reflected by targets, as receiving signals of the respective ports of the antenna 3. As the receiving signals are received, the process proceeds to step S02.

In step S02, the direction calculating unit 44 calculates the phase difference between the beat signals at the respective peak frequencies, and the calculated phase difference is stored in the memory 41. The phase difference calculated in step S02 is a phase difference based on actual measurement, and differs from a predicted phase difference described later. In addition, a phase difference in the case where the frequency spectrum of the moving target overlaps with the frequency spectrum of the stationary target is a combined phase difference of the phase difference calculated from the frequency spectrum of the moving target and the phase difference calculated from the frequency spectrum of the stationary target.

A phase difference is calculated on the basis of a phase-monopulse system. Specifically, the direction calculating unit 44 mixes parts of the received waves received by the antenna 3 with part of the transmitted wave to acquire the frequencies of the beat signals. In the first embodiment, the beat signals are subjected to Fourier transformation to obtain frequency spectrum data, and then the peak values of the frequency spectra are detected from the frequency spectrum data. Because the frequency spectrum data may be expressed as complex vectors on a complex plane, the phase of each beat signal may be, for example, calculated from an angle made between the complex vector and the real axis on the complex plane. Then, the difference in phase between the beat signals is obtained to calculate the phase difference, and then the directions of the targets are calculated on the basis of the calculated phase difference. Note that the phase difference between the beat signals is calculated for both the up section and down section of a triangular wave. The calculated phase differences are stored in the predetermined storage area in the memory 41 by the storage unit 45. Note that, in FIG. 5, the phase difference is stored target by target, that is, both the phase difference of the moving target and the phase differences of the stationary targets, are stored; however, in the first embodiment, it is applicable that only the phase differences of the stationary targets are stored. As the phase differences are stored, the process proceeds to step S03.

In step S03, the direction calculating unit 44 calculates the directions of the targets on the basis of the calculated phase differences of the targets. In addition, the distance measuring unit 49 calculates relative velocities with respect to the targets and distances to the targets. The relative velocities and the distances are calculated on the basis of an FM-CW system.

Figure 8:
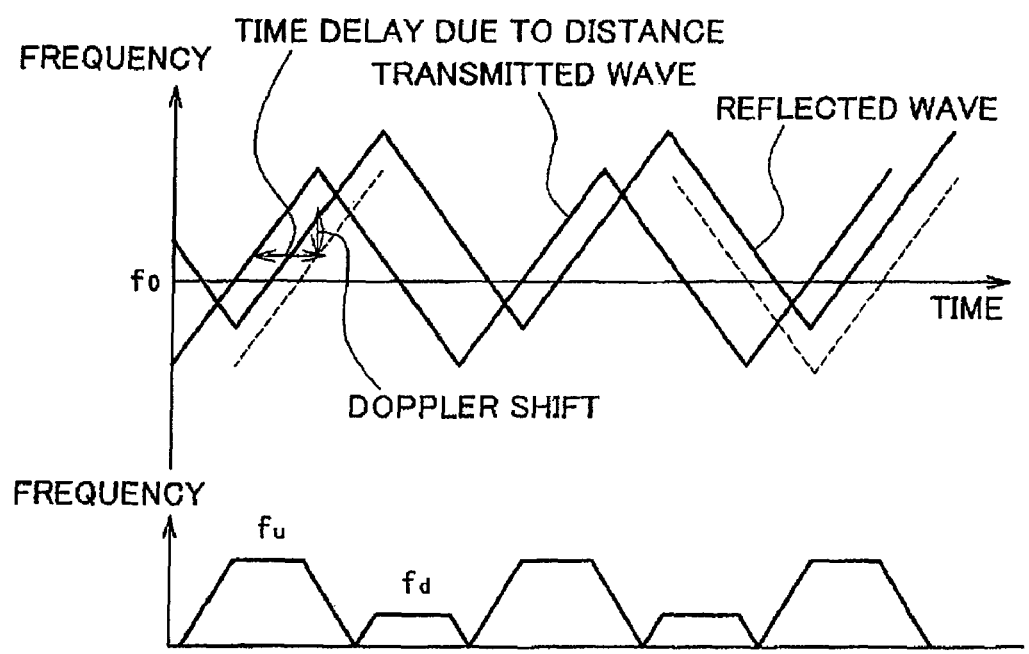
FIG. 8 shows a diagram of the principle of an FM-CW system.

Here, FIG. 8 shows a diagram of the principle of the FM-CW system. Where the frequency of the triangular wave in the up section is fu and the frequency of the triangular wave in the down section is fd, the relationship among fu, fd, a distance frequency fr and a velocity frequency fv is expressed as the mathematical expression (2).

$$fu=fr-fv\,fd=fr+fv \text{ (velocity in the approaching direction is expressed in a positive direction)} \quad (2)$$

Here, where the modulated frequency of the transmitted wave is FM, the modulated width having $f_0$ as a center frequency is $\Delta f$, the speed of light is c, the distance is R and the relative velocity is V, the mathematical expression (3) is obtained. As a result, the distances to the targets and the relative velocities with respect to the targets may be obtained from the detected fu and fd.

$$fr=((4\times\Delta f\times FM)/c)\times R\,fv=(2\times f_0/c)\times V \quad (3)$$

As the directions of the targets, the relative velocities with respect to the targets, and the like, are calculated, the process proceeds to step S04.

In step S04, the prediction unit 46 predicts whether the peak frequency of the stationary target overlaps with the peak frequency of the moving target. Specifically, the prediction unit 46 predicts whether the peak frequency of the stationary target overlaps with the peak frequency of the moving target on the basis of predicted information that includes direction information about the directions calculated by the direction calculating unit 44, relative velocity information about the relative velocities calculated by the distance measuring unit 49 and information about the port interval of the receiving antenna. In other words, variations in the frequency spectra are predicted from the directions of the targets, the relative velocities with respect to the targets and displacements in distances to the targets, and variations in the frequency spectra, calculated respectively for the moving target and the stationary target, are compared with each other to thereby make it possible to determine whether the peak frequencies overlap each other. When it is determined that the peak frequencies do not overlap each other, the process proceeds to step S05, and the directions calculated in step S03 are employed. That is, the directions calculated on the basis of the actually measured phase differences are employed. The employed directions are, for example, output to the ECU, and are used in vehicle control of a PCS, or the like. On the other hand, it is determined that the peak frequencies overlap each other, the process proceeds to step S21.

In step S21, the predicted phase difference calculating unit 47, for example, accesses the storage area in the memory 41 shown in FIG. 5, and calculates the predicted phase difference of the stationary target when the peak frequencies overlap each other on the basis of the stored phase difference of the stationary target. For example, the predicted phase difference calculating unit 47 maps the history of the phase difference of the stationary target, and calculates the predicted phase difference of the stationary target when the peak frequencies overlap each other from the history of the phase difference of the stationary target. As the predicted phase difference of the stationary target is calculated, the process proceeds to step S22.

In step S22, the determining unit 48 determines whether the difference between the predicted phase difference of the stationary target, calculated by the predicted phase difference calculating unit 47, and the phase difference (actually measured phase difference) calculated by the direction calculating unit 44 falls within a predetermined range. When the difference between the predicted phase difference of the stationary target and the actually measured phase difference falls within the predetermined range, the process proceeds to step S05. In this case, it is regarded that the phase difference of the moving target is not included, that is, only the phase difference of the stationary target is present, and the directions calculated in step S03 are employed. On the other hand, when the difference between the predicted phase difference of the stationary target and the actually measured phase difference does not fall within the predetermined range, the process proceeds to step S23.

In step S23, the predicted phase difference calculating unit 47 calculates the predicted phase difference of the moving target from the difference between the actually measured phase difference previously calculated by the direction calculating unit 44 and the predicted phase difference of the stationary target. As is described above, because the frequency spectrum data may be expressed as complex vectors on, a complex plane, the phase of the beat signal may be calculated from an angle made between the complex vector and the real axis on the complex plane. Then, the actually measured phase difference and the predicted phase difference of the stationary target each are expressed as a complex vector, so the complex vector of the predicted phase difference of the stationary target is subtracted from the complex vector of the actually measured phase difference to thereby make it possible to calculate the predicted phase difference of the moving target (see FIG. 6B). As the predicted phase difference of the moving target based on the difference is calculated, the process proceeds to step S24.

In step S24, the direction calculating unit 44 calculates the direction of the moving target on the basis of the predicted phase difference of the moving target based on the difference.

With the radar system 2 according to the above described first embodiment, even when the frequency spectra corresponding to different targets overlap each other, it is possible to accurately calculate the direction of each target, particularly, the direction of the moving target. In the first embodiment, the peak value at the peak frequency of the moving target is higher than the peak value at the peak frequency of the stationary target, so the peak frequency of the moving target may be acquired; however, the peak value at the peak frequency of the moving target, acquired in this case, includes the peak value at the peak frequency of the stationary target, so the calculated direction has an error. In the radar system 2 according to the first embodiment, not the direction or the relative velocity calculated on the basis of the phase difference itself is stored in the memory 41. By so doing, the predicted phase difference may be calculated on the basis of the stored phase difference of the stationary target, and, in addition, the predicted phase difference of the moving target may be calculated from the difference between the actually measured phase difference and the predicted phase difference of the stationary target. As a result, when the prediction unit 46 predicts that the peak frequencies, of the plurality of targets overlap each other, the directions of the targets may be calculated on the basis of the predicted phase difference of the moving target, calculated by the predicted phase difference calculating unit 47. Thus, even if the peak frequencies of a plurality of targets overlap each other, the directions of the respective targets may be accurately calculated. As a result, it is possible to avoid a malfunction of a pre-crash safety system (PCS) or non-detection of the targets.

In addition, in the radar system 2 according to the first embodiment, the determining unit 48 determines whether the difference between the predicted phase difference of the stationary target, calculated by the predicted phase difference calculating unit 47, and the actually measured phase difference calculated by the direction calculating unit 44 falls within the predetermined range, so it is possible to determine whether to calculate the predicted phase difference on the basis of the difference. In addition, because the prediction unit predicts whether the peak frequencies of the plurality of targets overlap each other, the determining unit 48 has a function of determining whether to execute processing by the predicted phase difference calculating unit 47 and checking the result predicted by the prediction unit 46. Furthermore, the radar system 2 according to the first embodiment incorporates the configuration of the control unit 4 or the configuration of part of the control unit 4 into the existing radar system 2 to thereby make it possible to calculate the direction of a target on the basis of the above described process. In other words, in the radar system according to the first embodiment, it is possible to improve, the accuracy of calculating the direction of a target without changing the hardware of the radar system.

The radar system 2 according to the second embodiment further includes a function of calculating the phase difference of the moving target at the time when the peak frequencies of the frequency spectra overlap each other as a predicted phase difference on the basis of the history of the phase difference of the moving target, stored in the storage area, and then calculating the directions of the targets using the calculated predicted phase difference of the moving target, and a function of smoothing the calculated phase difference through averaging.

The configuration of the radar system according to the second embodiment is basically the same as that of the radar system according to the first embodiment. However, part of the configuration of the control unit 4 further has the function described below.

The predicted phase difference calculating unit 47 calculates the phase difference of the moving target at the time when the peak frequencies overlap each other as a predicted phase difference on the basis of the phase differences of the moving target, stored in the storage area in the RAM of the memory 41. Specifically, any one of the phase difference in the up section and the phase difference in the down section is appropriately selected, and the predicted phase difference of the moving target at the time when the peak frequencies overlap each other is calculated on the basis of the selected phase difference of the moving target. For example, the predicted phase difference calculating unit 47 calculates the averaged phase difference that is obtained by averaging the phase differences of the moving target, stored in the storage area of the memory 41, and corrects the phase difference calculated by the direction calculating unit 44 on the basis of the averaged phase difference to thereby calculate the predicted phase difference.

When the prediction unit 46 predicts that the peak frequencies overlap each other, the determining unit 48 determines whether the difference between the predicted phase difference calculated by the predicted phase difference calculating unit 47 and the phase difference calculated by the direction calculating unit 44 falls within a predetermined range. The predetermined range may be set on the basis of the interval of the ports of the antenna 3, the accuracy of a calculated direction, the range of detection of a reflected wave, and the like.

When the prediction unit 46 predicts that the peak frequencies overlap each other, the direction calculating unit 44 calculates the directions of the targets on the basis of the predicted phase difference of the moving target, calculated by the predicted phase difference calculating unit 47 in addition to the predicted phase difference of the stationary target.

Figure 9:
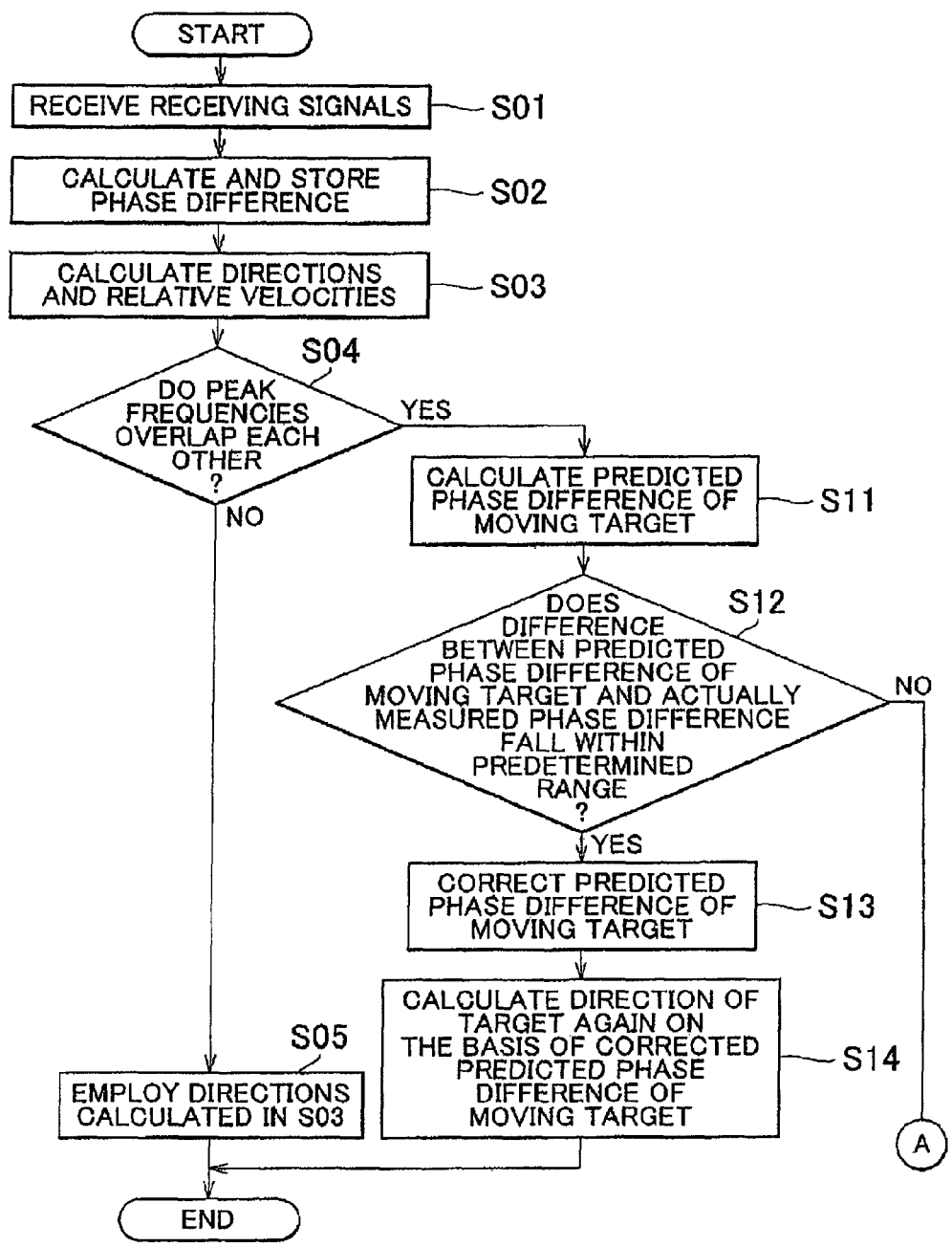
FIG. 9 shows a flowchart (1) of direction detecting process executed by a radar system according to a second embodiment.
Figure 10:
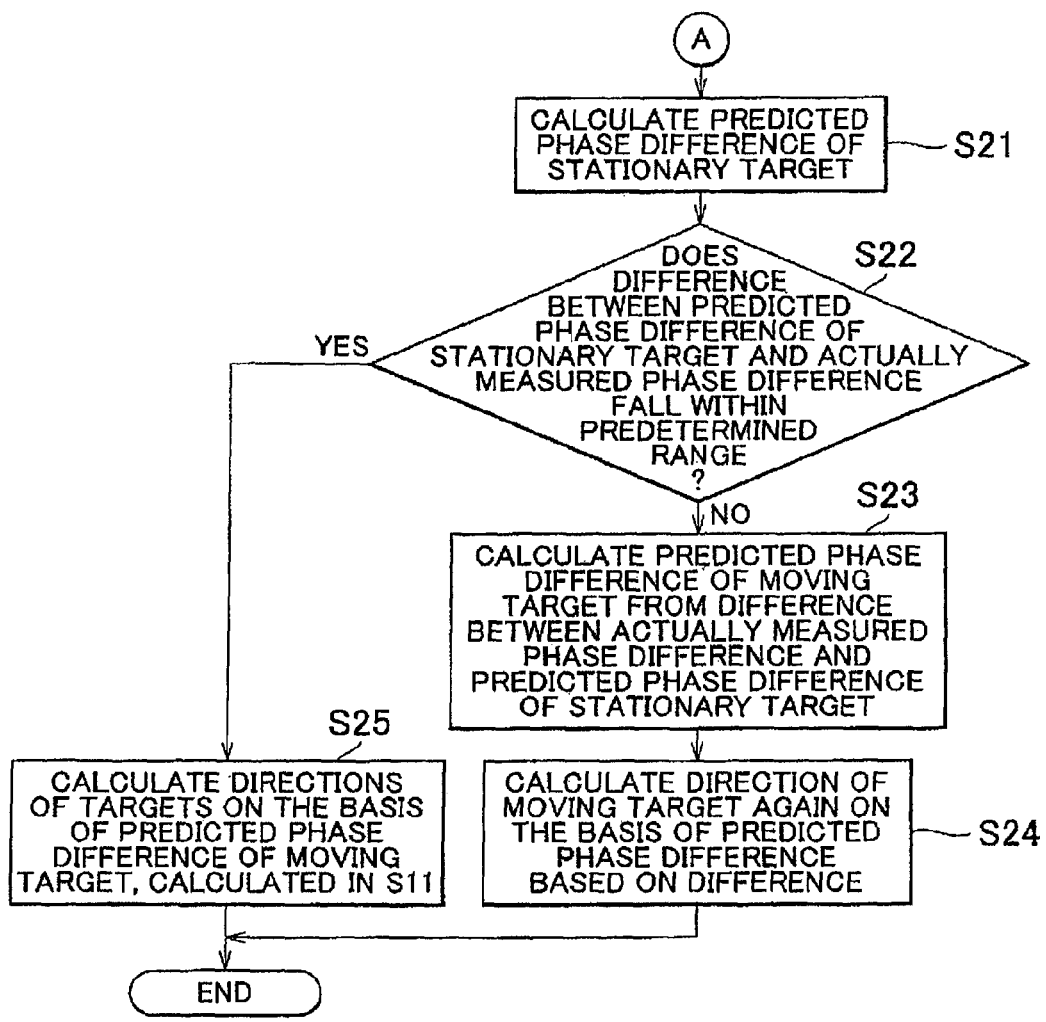
FIG. 10 shows a flowchart (2) of the direction detecting process executed by the radar system according to the second embodiment.

FIG. 9 shows a flowchart (1) of direction detecting process executed by the radar system according to the second embodiment. FIG. 10 shows a flowchart (2) of the direction detecting process executed by the radar system according to the second embodiment. The order of the process described in FIG. 9 and FIG. 10 is just one example, and the order of the process may be appropriately changed depending on an embodiment.

The process in step S01 to step S05 is the same as that of the first embodiment, so the description thereof is omitted. As it is determined in step S04 that the peak frequencies overlap each other, the process proceeds to step S11. In step S11, the predicted phase difference calculating unit 47, for example, accesses the storage area in the memory 41 shown in FIG. 5, and calculates the phase difference of the moving target at the time when the peak frequencies overlap each other as the predicted phase difference of the moving target on the basis of the stored phase differences of the moving target. For example, the predicted phase difference calculating unit 47 maps the history of the phase difference of the moving target, and calculates the predicted phase difference at the time when the peak frequencies overlap each other on the basis of the history of the phase difference of the moving target. As the predicted phase difference of the moving target is calculated, the process proceeds to step S12.

In step S12, the determining unit 48 determines whether the difference between the predicted phase difference of the moving target, calculated by the predicted phase difference calculating unit 47, and the phase difference (actually measured phase difference) calculated by the direction calculating unit 44 falls within a predetermined range. The predetermined range may be set on the basis of the interval d of the ports of the antenna 3, the accuracy of a calculated direction, the range of detection of a reflected wave, and the like. As the difference between the predicted phase difference of the moving target and the actually measured phase difference falls within the predetermined range, the process proceeds to step S13. On the other hand, when the difference between the predicted phase difference of the moving target and the actually measured phase difference does not fall within the predetermined range, the process proceeds to step S21 (see FIG. 10).

In step S13, the predicted phase difference calculating unit 47 corrects the predicted phase difference of the moving target, calculated in step S11. For example, the predicted phase difference calculating unit 47 calculates the averaged phase difference that is obtained by averaging the phase differences of the moving target, stored in the storage area of the memory 41, and corrects the phase difference of the moving target, calculated by the direction calculating unit 44 on the basis of the averaged phase difference, to thereby calculate the predicted phase difference of the moving target. The averaged phase difference may, be obtained by averaging the phase differences of the moving target, stored in the storage area, that is, obtained as the moving average of the phase difference of the moving target. The phase differences of the moving target as time-series data are smoothed and then the phase difference calculated by the direction calculating unit is corrected on the basis of the smoothed averaged phase difference to thereby calculate the predicted phase difference. By so doing, variations in the phase difference of the moving target may be suppressed, and, as a result, the directions of the targets may be further accurately calculated. Note that the moving average may be calculated in such a manner that n phase differences of the moving target, stored in the storage area, are simply averaged to obtain a simple moving average.

In addition, the moving average may be, for example, calculated in such a manner that a weight is assigned to the latest phase difference of the moving target and then the phase differences are averaged as a weighted moving average. Note that a weight may be varied in accordance with a relative velocity between the radar system and the moving target; and, for example, it is applicable that a predetermined relative velocity having less variations in data is predetermined and then a weight is assigned to the phase difference that falls within a predetermined velocity range. As the predicted phase difference is corrected, the process proceeds to step S14.

In step S14, the direction calculating unit 44 calculates the directions of the targets again on the basis of the predicted phase difference of the moving target, corrected in step S08.

On the other hand, in step S12, when the difference between the predicted phase difference of the moving target and the actually measured phase difference does not fall within the predetermined range, the process proceeds to step S21, and then the process from step S21 to step S25 is executed. The process in step S21 to step S24 is the same as that of the first embodiment, so the description thereof is omitted. In the first embodiment, when the difference between the predicted phase difference of the stationary target and the actually measured phase difference falls within the predetermined range in step S22, the process of step S05 is executed; however, in the second embodiment, the process proceeds to step S25 in this case.

In step S25, the direction calculating unit 44 calculates the directions of the targets on the basis of the predicted phase difference of the moving target, calculated in step S06.

With the radar system 2 according to the above described second embodiment, the phase difference of the moving target itself is stored in the memory 41 to thereby make it possible to calculate the predicted phase difference of the moving target on the basis of the stored phase differences of the moving target. By so doing, when the prediction unit 46 predicts that the peak frequencies of the plurality of targets overlap each other, the directions of the targets may be calculated on the basis of the predicted phase difference calculated by the predicted phase difference calculating unit 47. In addition, in the radar system 2 according to the second embodiment, the predicted phase difference calculating unit 47 has a function of calculating the averaged phase difference to correct the phase difference of the moving target, so it is possible to further improve the accuracy of detecting the directions of the targets.

In addition, with the radar system according to the second embodiment, as in the case of the radar system according to the first embodiment, the phase difference of the moving target may be calculated by subtracting the predicted phase difference of the stationary target from the actually measured phase difference, so it is possible to further improve the accuracy of the directions. Note that, in the second embodiment, the direction of the moving target based on the predicted phase difference of the moving target and the direction of the moving target based on the predicted phase difference of the stationary target are detected. Thus, it is also applicable that a comparison control unit that controls comparison between both directions is additionally provided, and, when the difference between both directions does not fall within a predetermined range, the process of detecting the directions again is executed; whereas, when the difference between both directions falls within the predetermined range, the average of both directions is employed.

The embodiments of the invention are described above; however, the radar system according to the aspect of the invention is not limited to the above configurations. The aspect of the invention may include a combination of these embodiments as much as possible. Note that, in the description of the embodiments, a phase-monopulse system is used as an angle measurement system that detects the direction of a target, and an FM-CW system is used as a distance measurement system that detects a relative velocity with respect to the target and a distance to the target. However, the technique relevant to the radar system according to the aspect of the invention may be applied to another angle measurement system or another distance measurement system as long as it is a technique for calculating a direction, or the like, on the basis of a phase difference.

The invention claimed is:

1. A radar system comprising:
a transmission antenna;
at least two reception antennas;
a transmitting unit that transmits a frequency-modulated transmitting signal as a transmitted wave transmitted via the transmission antenna;
a receiving unit that receives reflected waves that are the transmitted waves reflected by targets including a stationary target and a moving target and that are received via the at least two reception antennas as receiving signals of the respective reception antennas;
a direction calculating unit that calculates a phase difference between beat signals at respective peak frequencies to calculate directions of the targets on the basis of the calculated phase difference, wherein the beat signals are generated from the transmitting signal and the receiving signals of the respective reception antennas;
a storage unit that stores the phase difference, calculated by the direction calculating unit, in a storage area;
a prediction unit that predicts whether peak frequencies of the plurality of targets overlap each other on the basis of predicted information, which includes direction information about the directions of the targets, calculated by the direction calculating unit, and which predicts a variation in the peak frequency of each of the beat signals; and
a predicted phase difference calculating unit that calculates a predicted phase difference of the stationary target at the time when the peak frequencies overlap each other on the basis of the phase difference stored in the storage area, and that calculates a predicted phase difference of the moving target on the basis of the phase difference calculated by the direction calculating unit and the predicted phase difference of the stationary target, wherein
when the prediction unit predicts that the peak frequencies overlap each other, the direction calculating unit calculates the direction of the moving target on the basis of the predicted phase difference of the moving target, calculated by the predicted phase difference calculating unit.

2. The radar system according to claim 1, wherein the predicted phase difference calculating unit calculates the phase difference of the stationary target at the time when the peak frequencies overlap each other as the predicted phase difference of the stationary target on the basis of the phase difference stored in the storage area, and calculates the phase difference of the moving target as the predicted phase difference of the moving target from a difference between the phase difference calculated by the direction calculating unit and the predicted phase difference of the stationary target.

3. The radar system according to claim 1, further comprising:
a determining unit that determines whether a difference between the predicted phase difference of the stationary target, calculated by the predicted phase difference calculating unit, and the phase difference calculated by the direction calculating unit falls within a predetermined range, wherein when the determining unit determines that the difference between the predicted phase difference of the stationary target and the phase difference calculated by the direction calculating unit does not fall within the predetermined range, the predicted phase difference calculating unit calculates the predicted phase difference of the moving target on the basis of the phase difference calculated by the direction calculating unit and the predicted phase difference of the stationary target.

4. A target direction calculation method comprising:

transmitting a frequency-modulated transmitting signal as a transmitted wave transmitted via a transmission antenna;

receiving reflected waves that are the transmitted waves reflected by targets including a Stationary target and a moving target and that are received via at least two reception antennas as receiving signals of the respective reception antennas;

calculating a phase difference between beat signals at respective peak frequencies to calculate directions of the targets on the basis of the calculated phase difference, wherein the beat signals are generated from the transmitting signal and the receiving signals of the respective reception antennas;

storing the calculated phase difference in a storage area;

predicting whether peak frequencies of the plurality of targets overlap each other on the basis of predicted information, which includes direction information about the calculated directions of the targets and which predicts a variation in the peak frequency of each of the beat signals; and calculating a predicted phase difference of the stationary target at the time when the peak frequencies overlap each other on the basis of the phase difference stored in the storage area, and calculating a predicted phase difference of the moving target on the basis of the calculated phase difference and the predicted phase difference of the stationary target, wherein when it is predicted that the peak frequencies overlap each other, the direction of the moving target is calculated on the basis of the calculated predicted phase difference of the moving target.

5. The radar system according to claim 2, further comprising:

a determining unit that determines whether a difference between the predicted phase difference of the stationary target, calculated by the predicted phase difference calculating unit, and the phase difference calculated by the direction calculating unit falls within a predetermined range, wherein when the determining unit determines that the difference between the predicted phase difference of the stationary target and the phase difference calculated by the direction calculating unit does not fall within the predetermined range, the predicted phase difference calculating unit calculates the predicted phase difference of the moving target on the basis of the phase difference calculated by the direction calculating unit and the predicted phase difference of the stationary target.

* * * * *